Figure 9:
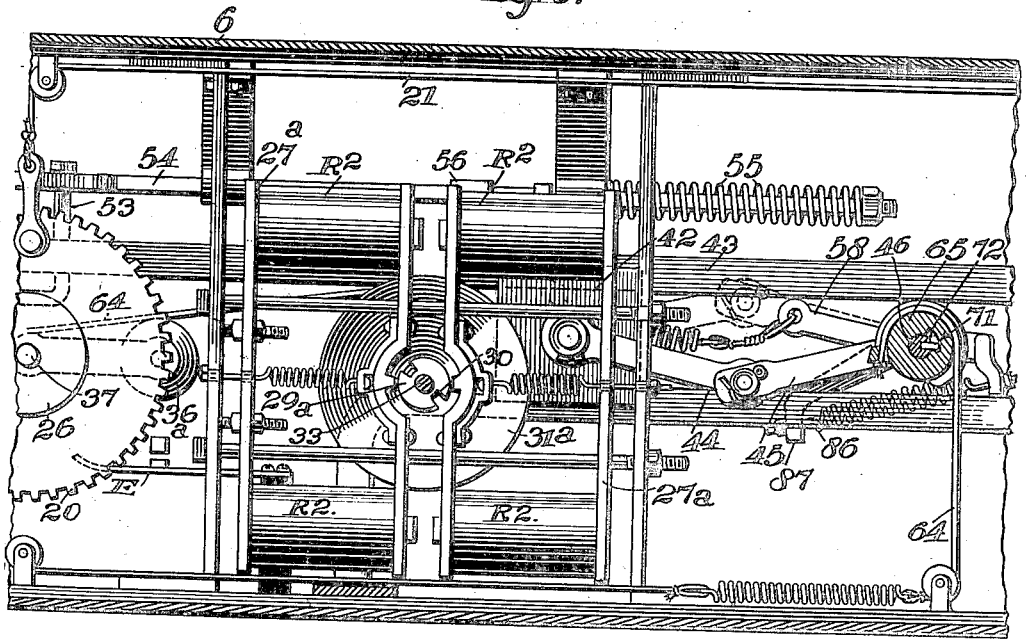

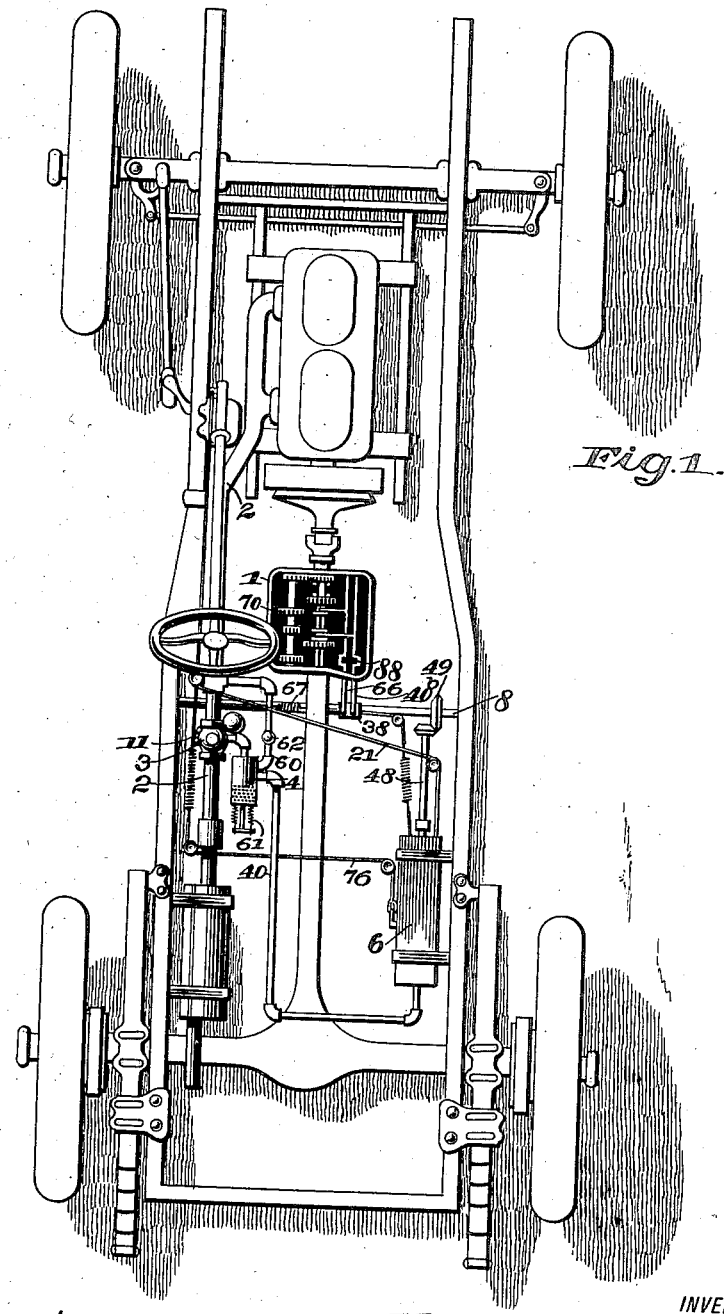

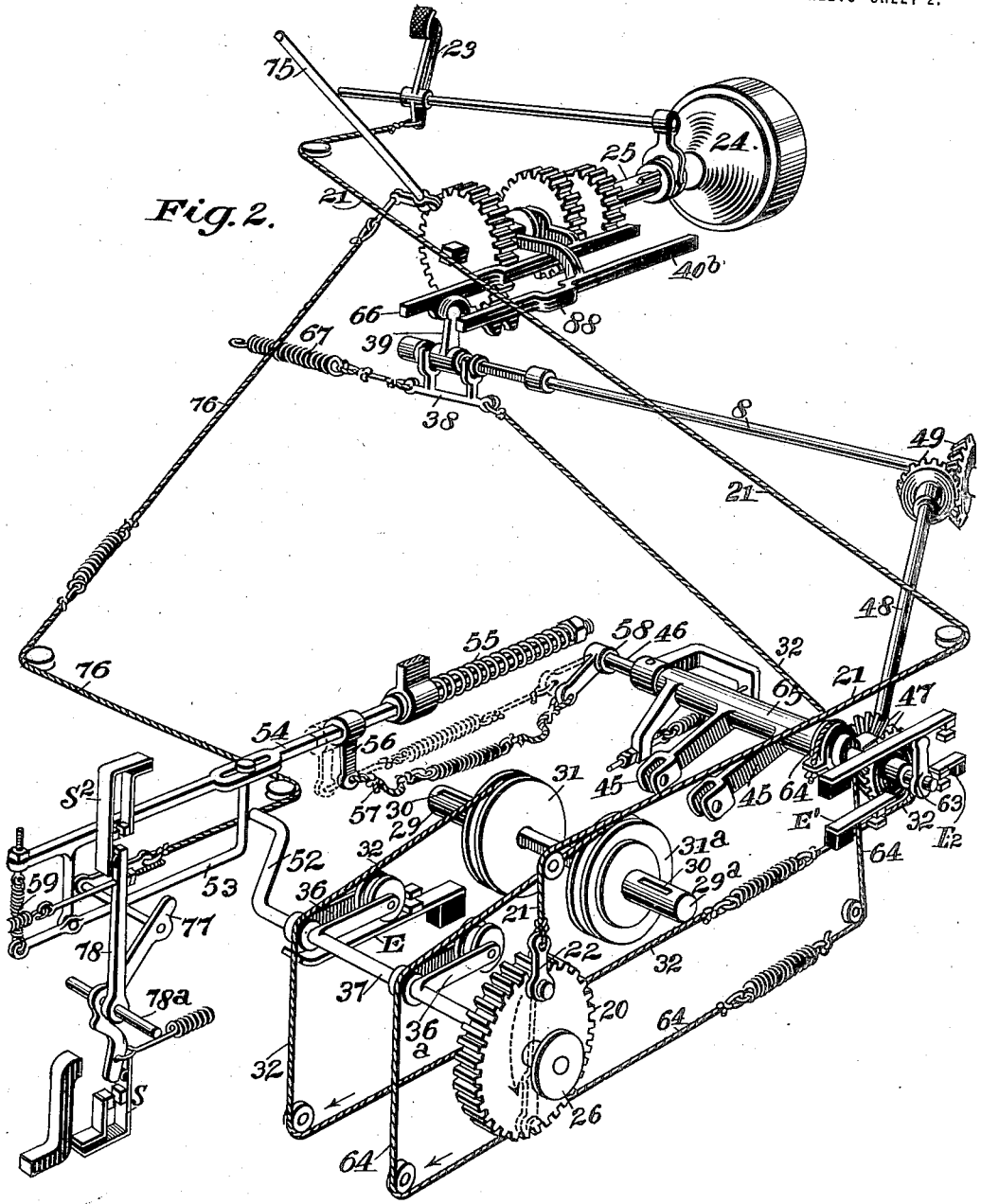

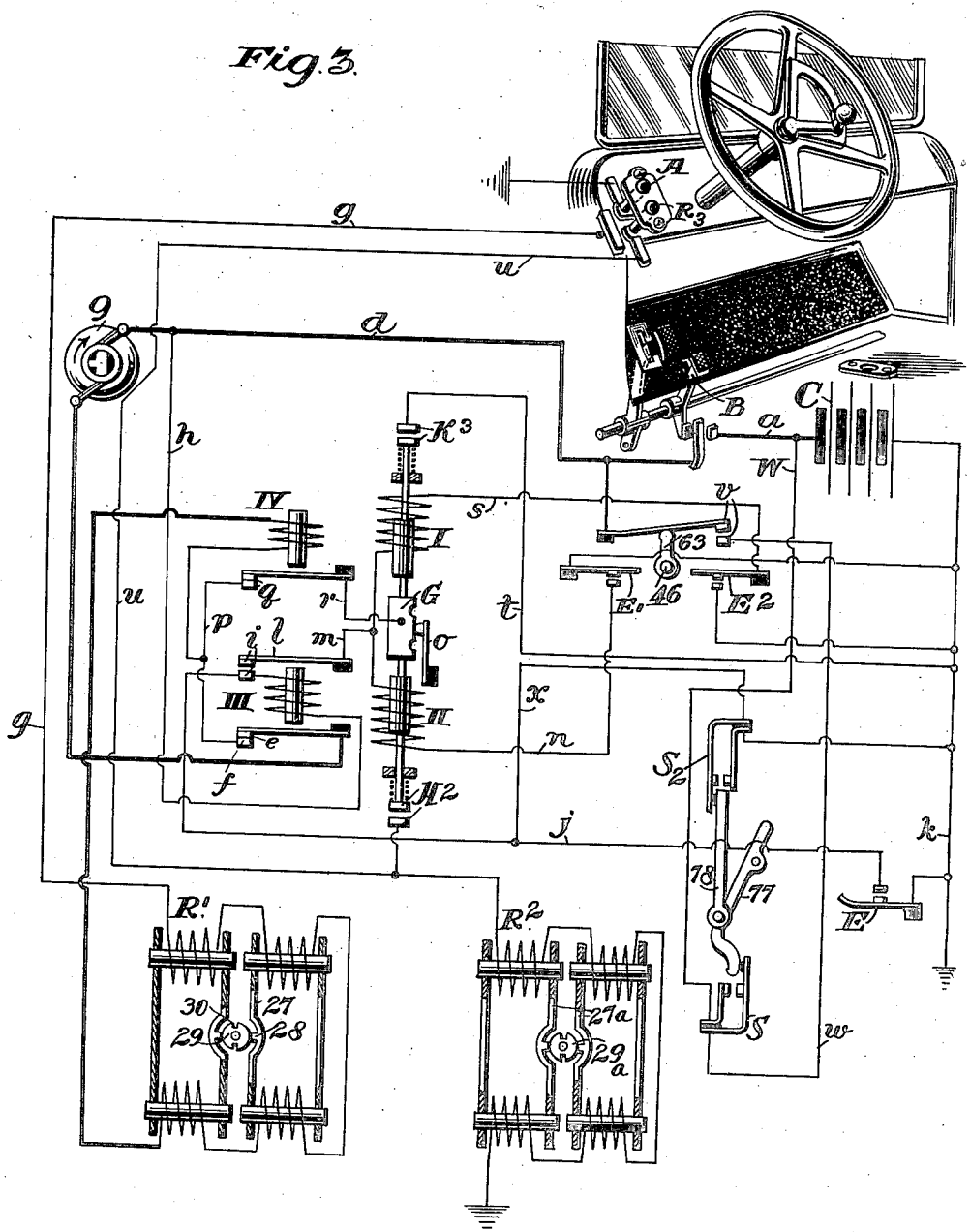

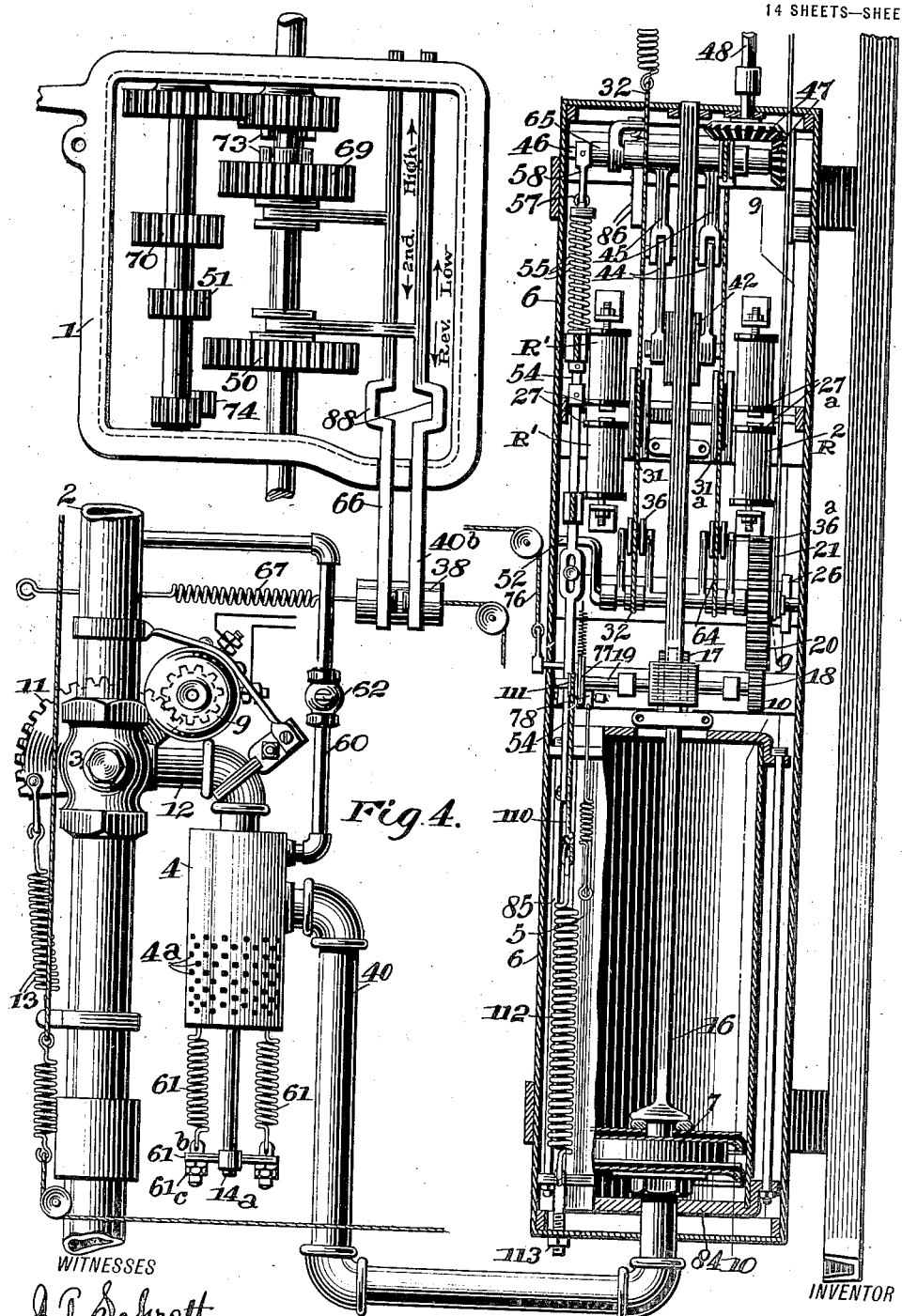

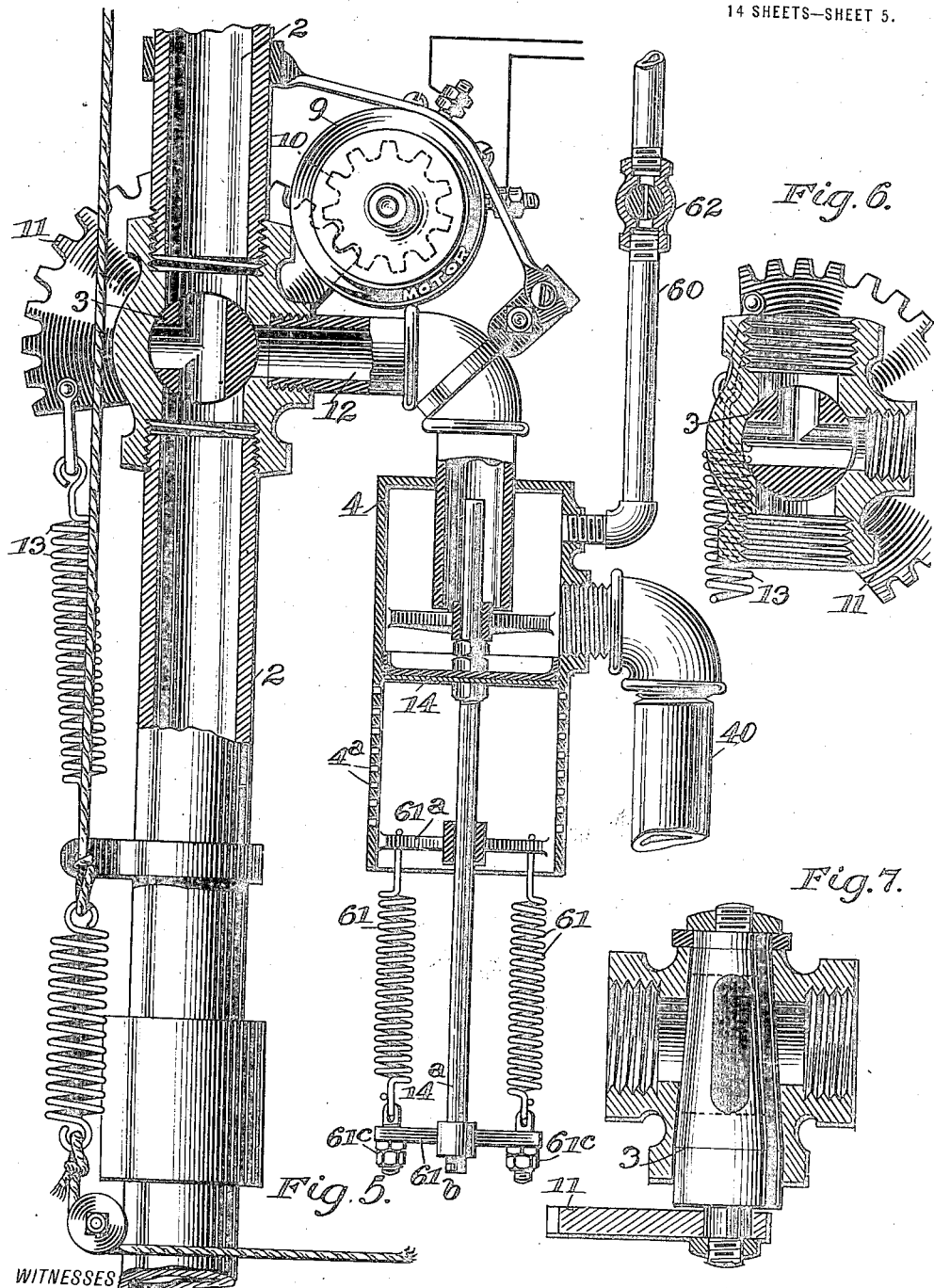

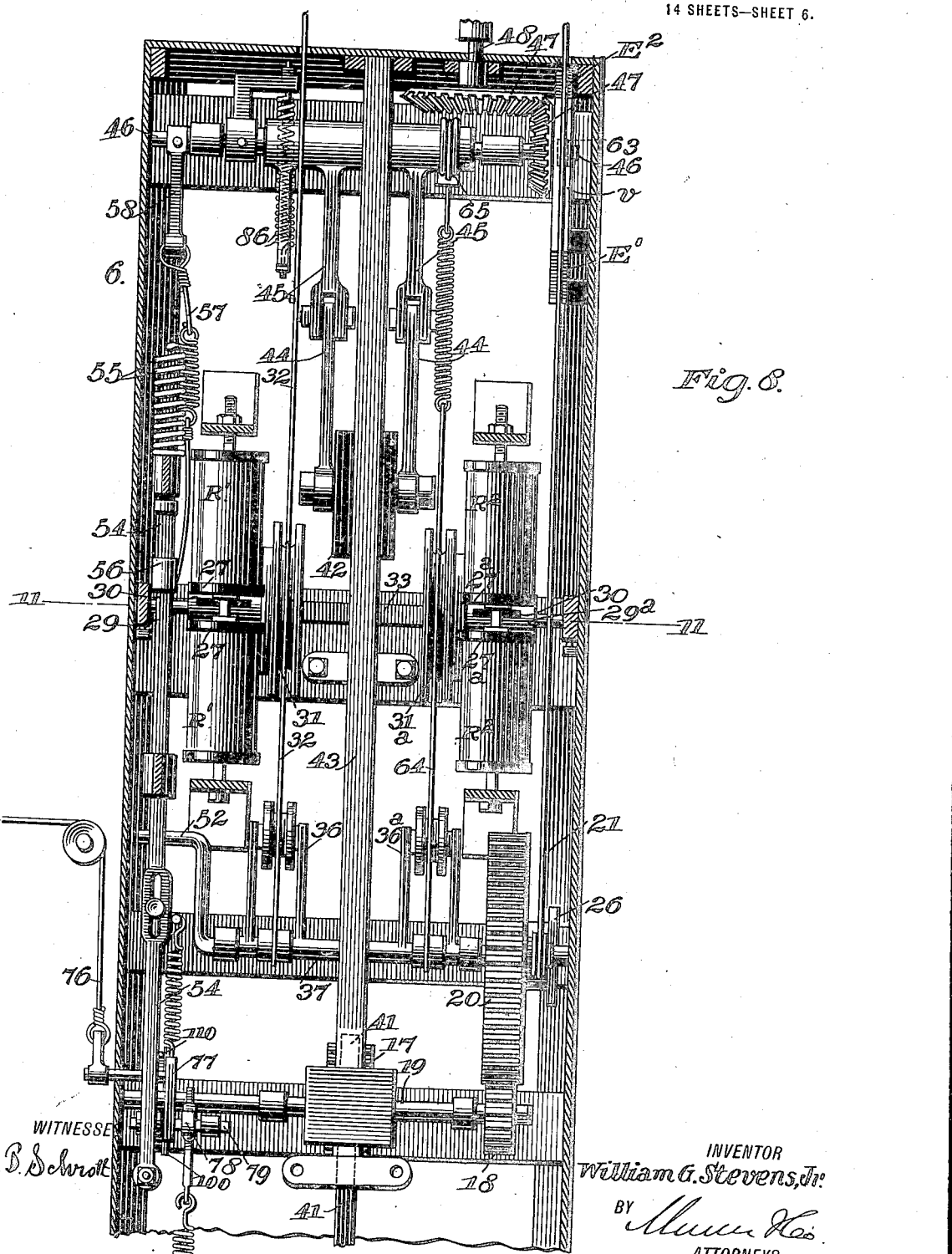

W. G. STEVENS, Jr.
GEAR SHIFTER.
APPLICATION FILED SEPT. 30, 1919.
1,417,213.
Patented May 23, 1922.
14 SHEETS—SHEET 8.
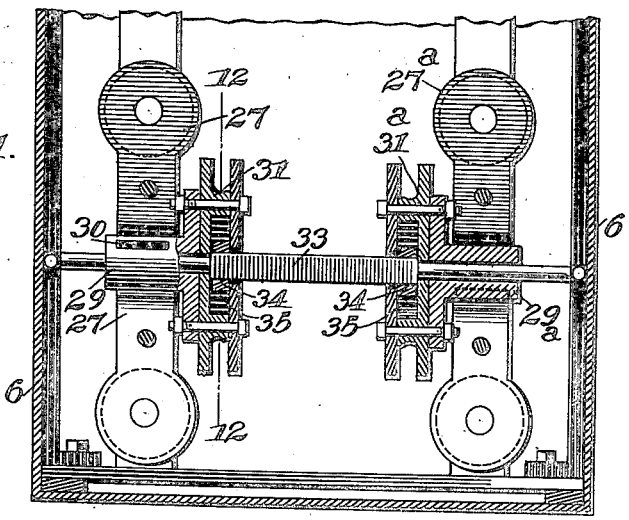
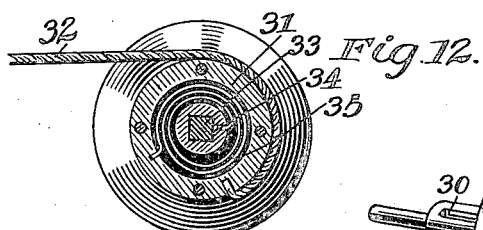
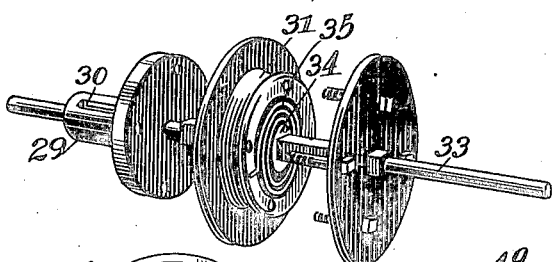
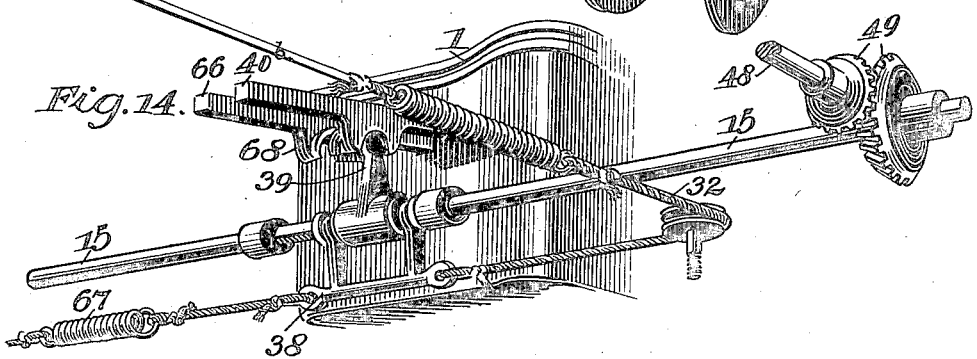
WITNESSES
J. P. Schrott
INVENTOR
William G. Stevens, Jr.
BY
ATTORNEYS

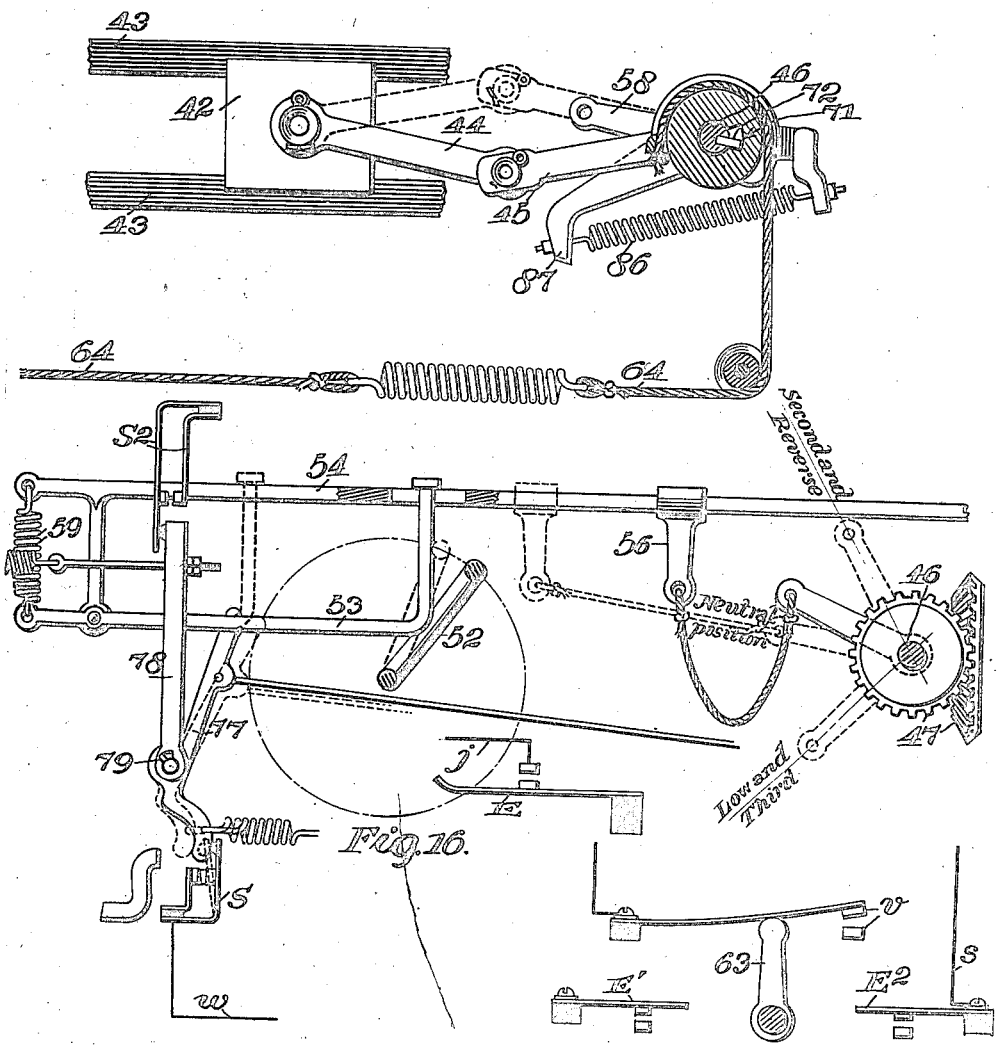

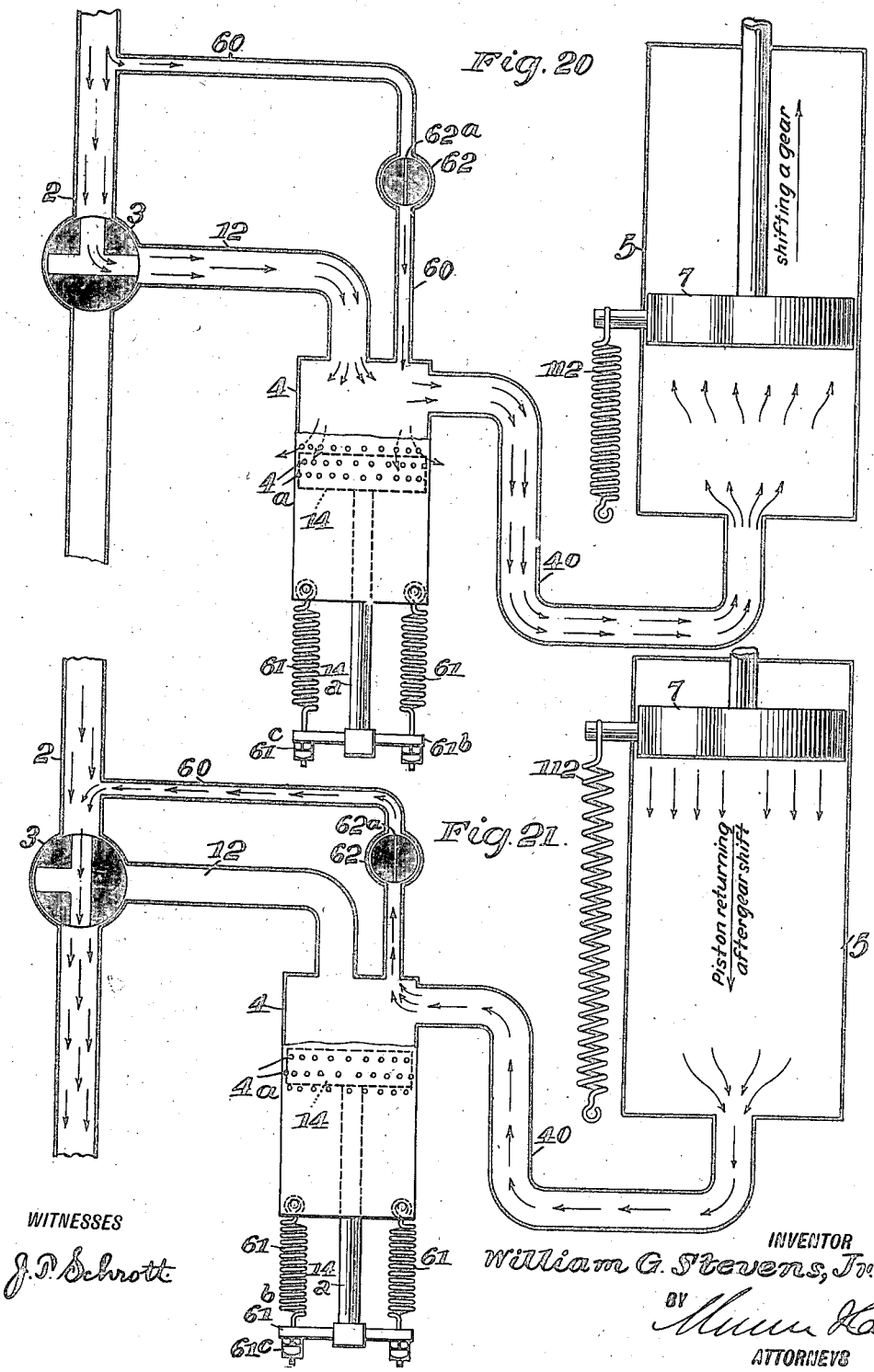

W. G. STEVENS, Jr.
GEAR SHIFTER.
APPLICATION FILED SEPT. 30, 1919.

1,417,213.

Patented May 23, 1922.
14 SHEETS—SHEET 12.

WITNESSES
J. P. Schrott

INVENTOR
William G. Stevens, Jr.
BY
ATTORNEYS

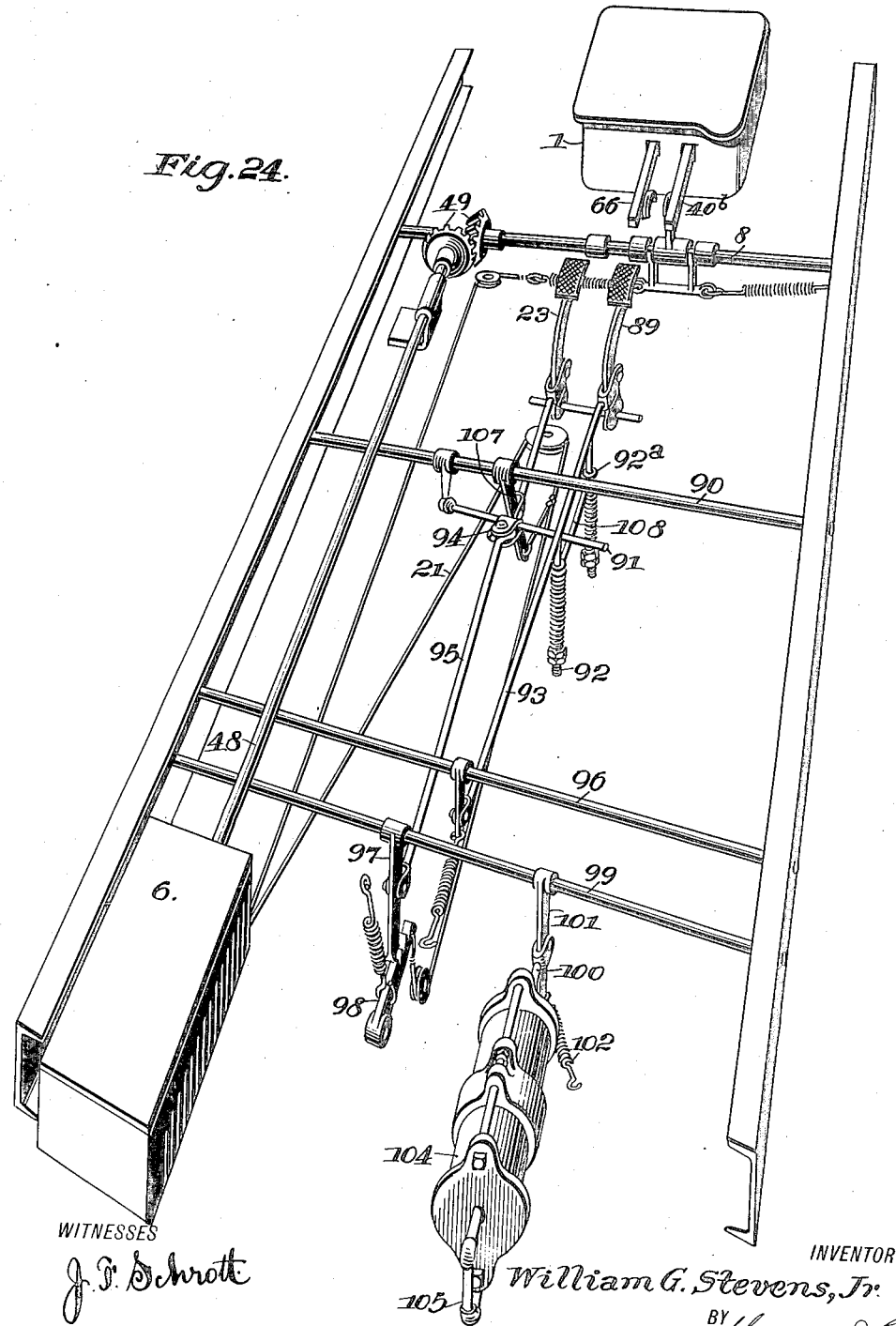

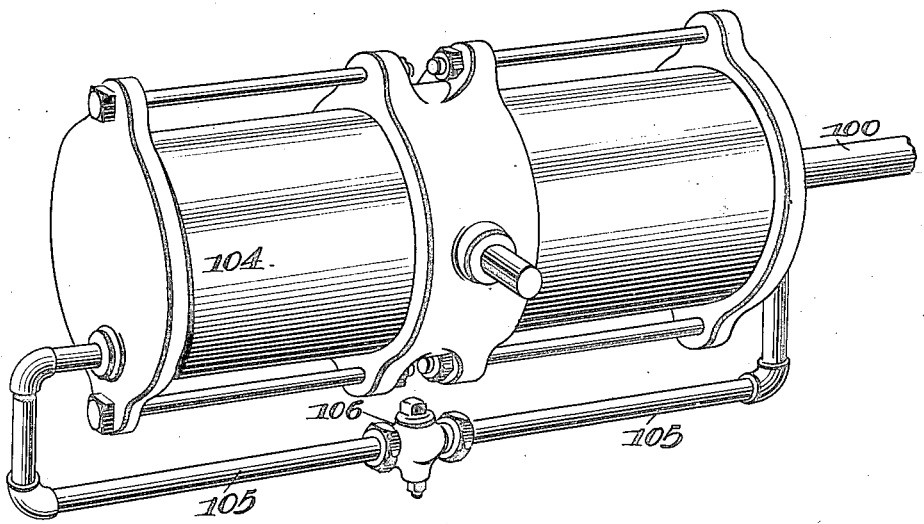
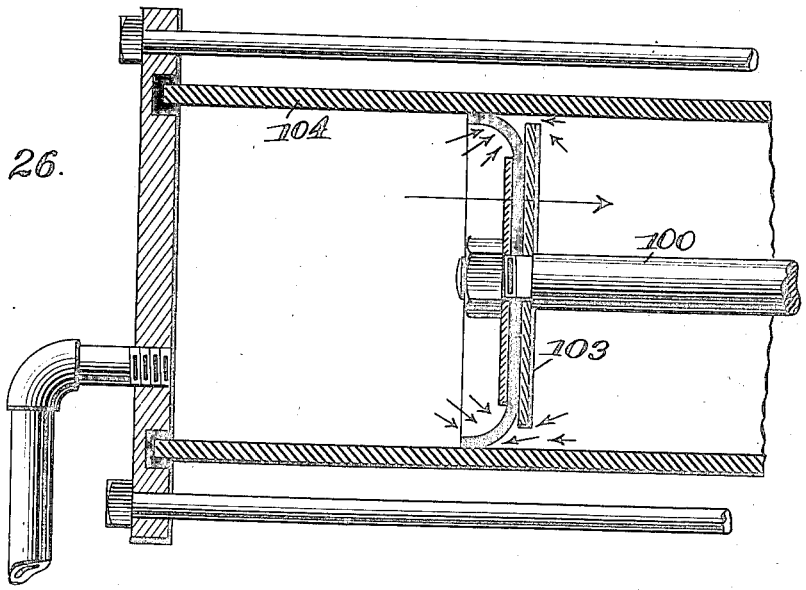

UNITED STATES PATENT OFFICE.

WILLIAM GRANT STEVENS, JR., OF WILLIS, TEXAS.

GEAR SHIFTER.

1,417,213.  Specification of Letters Patent.  Patented May 23, 1922.

Application filed September 30, 1919. Serial No. 327,416.

*To all whom it may concern:*

Be it known that I, WILLIAM GRANT STEVENS, Jr., a citizen of the United States, and a resident of Willis, in the county of Montgomery and State of Texas, or Sao Paulo, Brazil, South America, have made certain new and useful Improvements in Gear Shifters, of which the following is a specification.

My invention relates to improvements in gear shifters for motor vehicles, and it consists in the constructions, combinations and arrangements herein described and claimed.

The foremost object of my invention is to provide a gear shifting mechanism which is almost wholly actuated by the exhaust gas of the motor, certain steps in the operation being accomplished by the brief use of electricity, all of the functions of the speed changing mechanism being thus accomplished by simply actuating several push buttons.

Another object of the invention is to provide means in gear shifting mechanism for an automobile, for utilizing exhaust gas pressure to first neutralize the transmission gears, disengage the driving clutch and finally shift the gears to the proper combination, in order to obtain the desired speed.

A further object of the invention is to provide a gear shifting mechanism of the character described, in which the exhaust gas, the force of which was expended in making a circuit gear shift, is expelled by the action of the clutch spring.

A further object of the invention is to provide in the exhaust gas line, a pressure valve by means of which an approximately constant pressure is maintained for the operation of the gear shifting mechanism, regardless of the volume of exhaust gas discharged by the motor.

A further object of the invention is to provide means for controlling the speed of clutch engagement, said means comprising a regulatable exhaust gas valve operatively associated with the pressure valve above referred to.

A further object of the invention is to provide instrumentalities for automatically disengaging and reengaging the clutch at the proper time each time a gear shift is made.

A further object of the invention is to provide a mechanism for the purpose described and to be operated by fluid under pressure, in which there are relatively few and simple parts when compared with the functions they are to perform, the parts being readily accessible and easy to repair.

A further object of the invention resides in the ability to operate the gear shifting mechanism by a lever that is carried in the tool box and made use of in the event that the fluid pressure actuated mechanism or parts of the electrically controlled mechanism may fail to operate.

Figure 10:
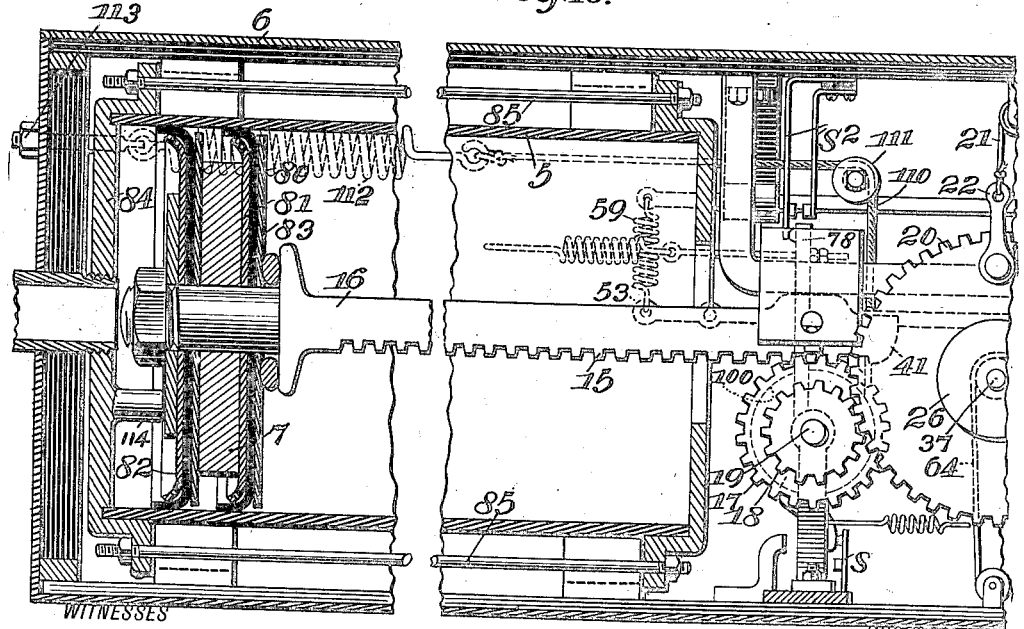
Figure 18:
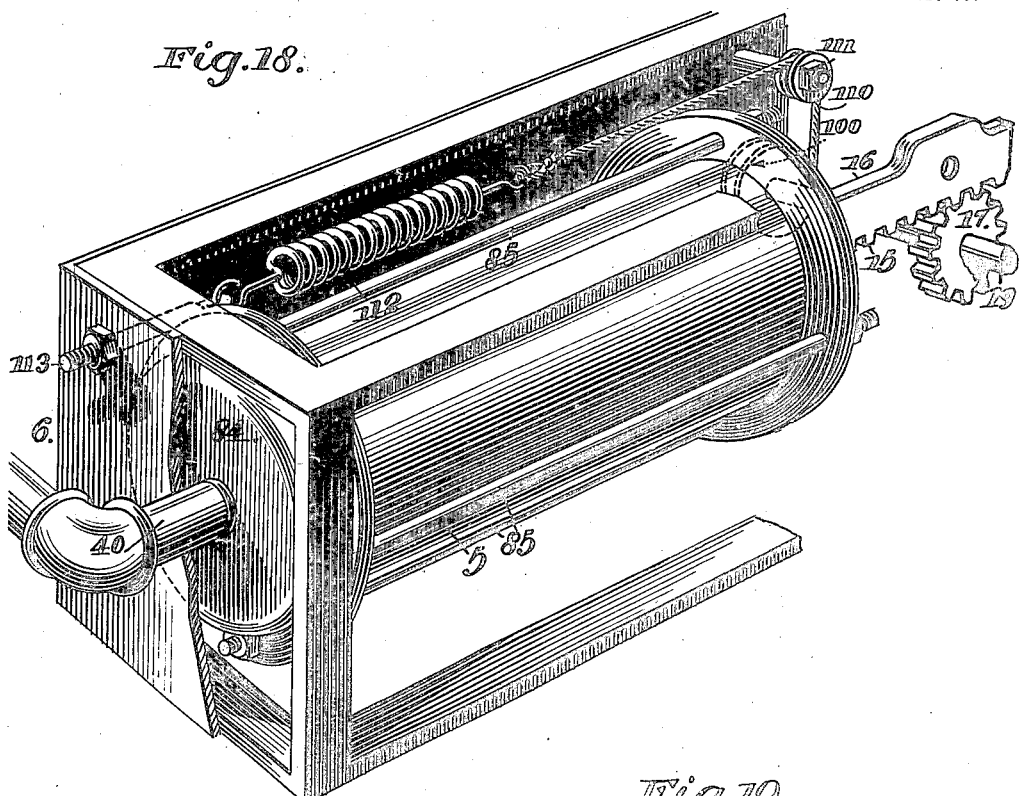
Figure 19:
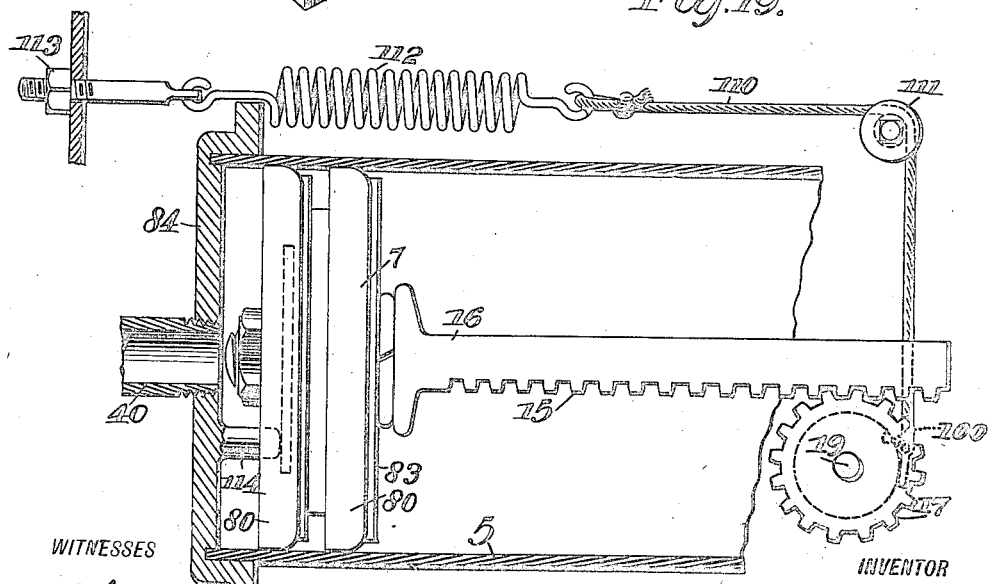
Figure 23:
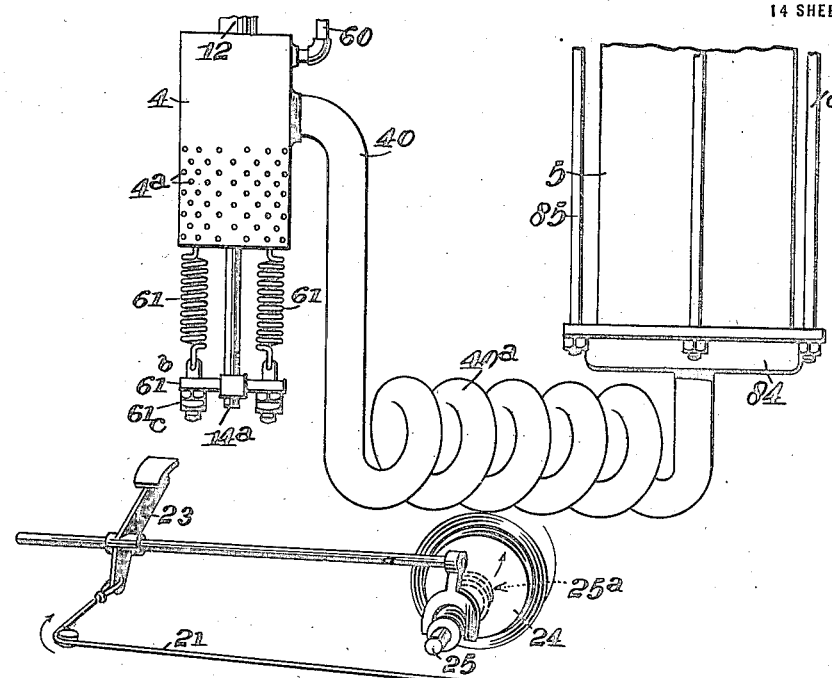
Figure 22:
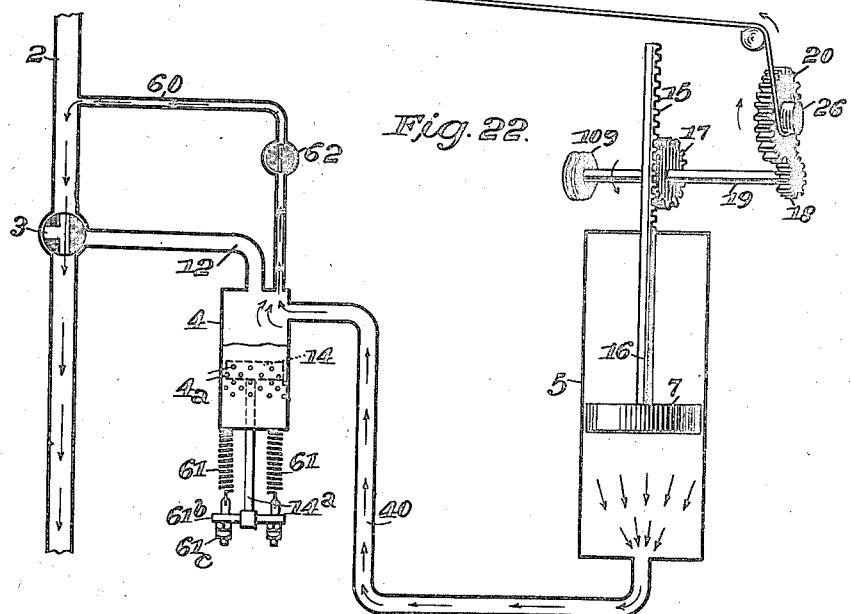

Other objects and advantages will appear in the following specifications, reference being had to the accompanying drawings, in which:

Figure 1 is a plan view of the chassis of a motor vehicle showing the invention applied, Figure 2 is a diagrammatic perspective view showing the main parts of the gear shifting mechanism, Figure 3 is a diagram of the electrical apparatus, Figure 4 is a plan view with parts shown in section, illustrating the co-relationship of the automatic gear shifting mechanism, the transmission gearing and the automatic exhaust gas control, Figure 5 is an enlarged view shown in section of the automatic gas control, Figure 6 is a sectional view of the three-way valve in its second position, Figure 7 is a vertical section of the valve, Figure 8 is a plan view on a larger scale, of the upper part of the gear shifting mechanism in Figure 4, Figure 9 is a section taken substantially on the line 9—9 of Figure 4, Figure 10 is a detail section taken substantially on the line 10—10 of Figure 4, Figure 11 is a cross section on the line 11—11 of Figure 8, Figure 12 is a cross section on the line 12—12 of Figure 11, Figure 13 is a perspective view showing the various parts of one of the lock reels in Figure 11 separated, Figure 14 is a perspective view showing more particularly the shifting frame that cooperates with the transmission gearing, Figure 15 is a detail view of the toggle arms and mechanism for revolving the dual-revoluble shaft in either of two directions, Figure 16 is a diagram illustrating parts that come into operation when the neutralizing device is used, Figure 17 is a detail view of the mechanically actuated contacts that cooperate with the dual-revoluble shaft, Figure 18 is a detail perspective view of the exhaust gas cylinder and the retractor spring which returns the piston in the cylinder, Figure 19 is a detail sectional view, illustrating how the retractor spring remains under tension to keep the piston normally at the extreme front end of the gas cylinder, Figures 20 and 21 are diagrams illustrating the actions of the gear shifting piston in the gas cylinder, Figure 22 is a diagram showing how the clutch spring assists in returning the piston in the gas cylinder, Figure 23 is a detail view showing how a serpentine pipe or coil may be used instead of the straight pipe between the pressure valve and gas cylinder, Figure 24 is a diagram of an improved brake mechanism to be used in connection with the gear shifter, Figure 25 is a perspective view of the brake engager cylinder, and Figure 26 is a detail sectional view of said cylinder, illustrating the action of the piston on the fluid in the cylinder.

Generally stated, the improved gear shifting mechanism is to be used on automobiles or other vehicles having a three speed forward and a one speed reverse selective type of sliding gear transmission mechanism. The three major elements of the gear shifter comprise a gas pressure cylinder; three valves for controlling the exhaust gas flowing to and from the gas cylinder; and various mechanisms dependent on the motion of a rack piston rod of a piston contained in the gas cylinder.

This gas cylinder and its companion mechanism takes up but very little room on the chassis of the automobile. The entire apparatus can be enclosed in a casing measuring approximately 30 inches long and 5 inches square, the actual size of course depending on the dimensions of the mechanism on the inside, which in turn is subject to some variation according to the size of the transmission gearing it is called upon to shift.

In Figures 1 and 4, the usual transmission mechanism is situated in a casing 1. The shifting of the various gears in this casing is done altogether by the power furnished by exhaust gas in the conduit 2 from the automobile engine, which gas at certain times is diverted by the three-way valve 3 into the pressure regulating valve 4.

From here the gas is conducted through a relatively long pipe 40 to the exhaust gas cylinder 5 of the automatic gear shifting mechanism 6. This relatively long pipe 40 may be serpentine or coil shaped, as at 40ª in Figure 23, if desired. Upon introduction of the exhaust gas into the cylinder 5, the piston 7 is moved forwardly and its motion is finally transmitted to the shifting shaft 8 which has such connection with the gears in the transmission case 1, that they are shifted either forwardly or backwardly to obtain the desired result.

The foregoing is a very brief statement of what is actually accomplished, and the operations may be more specifically reduced to the following;—(1) The gears being in neutral, to be shifted into first speed and vice versa. (2) The gears being in first speed, to be shifted into second and vice versa. (3) The gears being in second speed to be shifted into third and vice versa. (4) The gears being in neutral, to be shifted into reverse and vice versa. (5) The gears being in second speed to be shifted into neutral. (6) The gears being in third speed, to be shifted into neutral. All of these operations are controlled by the electrical apparatus in Figure 3, and of necessity the paths of the various circuits, the various devices that they operate and the resultant actions on the mechanical parts, must be described in the order above outlined.

*Operation of gear shift (1).*

Attention is directed to the electrical diagram in Figure 3 in connection with Figures 2 and 5. Push button A is depressed. Pedal B is depressed, whereupon current flows from the positive pole of the battery C, over wire $a$, contacts $b$ and $c$, wire $d$, through the three-way valve motor 9, normally closed contacts $e$ and $f$, magnet IV, clutch magnets R' and back to ground over the negative wire $g$.

The three-way valve motor 9 is thus energized and its pinion 10 rotates the quadrant 11, turning the three-way valve 3 so that the conduit 2 is placed in communication with the pipe 12 which leads into the pressure valve 4. The turning of the quadrant 11 places the spring 13 under tension, and the tension of this spring operates to return the valve 3 to its original position when its function is fully performed and the motor 9 is de-energized. The exhaust gas initially discharged into the valve 4 behind the valve piston 14, is conducted through the relatively long pipe 40 to the gas cylinder 5 where it drives the actuating piston 7 forwardly.

The rack 15 of the piston rod 16, turns the gear 17 in a clockwise direction, so that the pinion 18 on the same shaft 19 revolves the clutch-pedal gear 20 in a counter-clockwise direction. A clutch cable 21 is joined at one end to the gear 20 by the link 22, and at the other end to the clutch-pedal 23. When the gear 20 revolves as stated, the clutch-pedal 23 is operated to throw the clutch 24 on the shaft 25 out against the tension of the usual clutch spring 25ª indicated in dotted lines in Figure 23. The movement of the clutch-pedal and clutch continues through approximately 180° of revolution of the gear 20, at the end of which time the cable 21 reaches the sheave 26 outside of the gear, and henceforth very little movement of the pedal and clutch results in the subsequent turning of the gear 20.

A sheave 109 is located on the shaft 19 opposite to the pinion 18, to which the cable 110, running over the guide pulley 111, is attached. The other end of this cable is secured to the retractor spring 112, which is adjustably mounted at 113 on any convenient part of the frame. Now as the shaft 19 is rotated, as described, the retractor spring 112 is put under tension, at a subsequent period to assist in returning the piston 7 to the normal position in the gas cylinder 5. The combined efforts of the clutch spring 25ª and retractor spring 112 thus expels the gas from the gas cylinder 5, through a clutch valve 62 which has a minute orifice, the size of which controls the speed of engagement of the clutch 25.

In Figure 19, the piston 7 is shown to have returned to the normal position, at which time it is held in engagement with the stop 114 by the tension of the retractor spring 112. This spring is so adjusted that when the piston 7 is at the normal position, it will not be entirely contracted, thereby holding the piston 7 against the stop 114 and preventing the jarring of the automobile from moving the piston 7 forwardly and shifting the associated parts out of adjustment. Of course the stop 114 may be replaced by any other suitable means, that is to say, the piston 7 may be so arranged as to engage the adjacent end of the cylinder 5, but in the present instance the stop 114 is merely shown to prevent closure of the gas pipe 40 which discharges adjacent to the jamb nut at the end of the piston 7.

Upon energization of the clutch magnets R′, the lock plates 27 were mutually attracted so as to bind the teeth 28 against the hub 29 in readiness to enter the recesses 30 in the initial subsequent rotation of the hub. The hub 29 is part of a lock reel 31 to which one end of the shifter cable 32 is attached and partly wound. A part of the lock reel shaft 33 is square and the ends are round. The shaft is fixed and does not rotate.

A spring hub 34 is fixed on the square part of the shaft 33. A coil spring 35 is fastened at its respective ends to the hub 34 and the lock reel 31, and is the means that permits the cable 32 to be paid out under circumstances where tension in the cable is not required. A circumstance where tension is required appears now.

Tension in the shifter cable 32 is created on the engagement of the shifter arm 36 with the cable on its upward movement. The shifter arm is carried by the shaft 37 on which the gear 20 is mounted, and as the gear 20 rotates in the counter-clockwise direction previously referred to, the arm 36 of course presses upwardly on the cable 32. Since the reel 31 is locked by virtue of the energization of the magnets R′, the cable cannot pay out but must give in the direction of the arrow in Figure 2, thereby pulling the shifting frame 38 over toward the right so that the shifting arm 39 engages the first speed and reverse rod 40ᵇ.

As the rack piston 16 continues to advance, the end 41 in Figure 10 soon strikes the toggle block 42 in Figures 9 and 15. The toggle block moves between guides 43 and has pivoted thereto one of a pair of toggle arms 44, 45. Normally the toggle arms are disposed in the downwardly inclined position indicated in full lines in Figure 15. The dual-revoluble shaft 46 is turned in one direction or the other, accordingly as the toggle arms are positioned.

The toggle arms 44, 45 bend downwardly under the influence of the pressure of the rack piston rod 16 against the block 42, and the shaft 46 is revolved in a counter-clockwise direction. This motion is transmitted through gears 47, counter-shaft 48, gears 49 and shifting shaft 8, to the shifting arm 39 which pulls the rod 40 forwardly, moving the gear 50 into engagement with the first speed gear 51 and thus obtaining the first speed.

Means is provided for setting the toggle arms 44, 45 in readiness for the first action in the event they may be in positions other than that shown in full lines in Figure 15. This means consists of a crank 52 on the end of the shaft 37, which engages and moves the trip arm 53 of the setting rod 54 rearwardly against the tension of the spring 55. The rod 54 has an arm 56 with a flexible connection 57 to the arm 58 of the dual-revoluble shaft 46. When the connection is straightened, the arm 58 is pulled into the horizontal position, and in this position the toggle arm 45 is inclined downwardly. The gears in the transmission case 1 are by this means brought to the starting or neutral positions. If desired, a roller may be placed on the end of crank 52 so that it will engage the trip arm 53.

A spring 59 between the free end of the pivoted trip arm 53 and the rod 54 on which it is mounted, permits the crank 52 to move under the trip arm on the reverse movement when the actuating piston 7 and rod 16 return. The piston 7 is returned automatically by virtue of the spring 112 in Figures 18 and 21. The movements of the piston 7 are clearly illustrated in Figures 20 and 21, wherein it is seen that when the motor-controlled valve 3 is opened to the pipe 12, exhaust gas enters the gas cylinder 5 and forces the piston 7 forwardly, at the same time touching the spring 112.

When the valve 3 is closed to the pipe 12, upon de-energization of the actuating motor 9 as appears more fully below, the tension of the spring 112, assisted by the spring 25$^a$ of the clutch mechanism, reacts on the piston 7, forcing the gas out of the cylinder as shown by the arrows in Figs. 21 and 22.

It is at this time that a valve 62, properly termed the "clutch valve", comes into use. This valve is located in a relatively small pipe 60 which leads from the automatic pressure valve 4 to the exhaust gas conduit 2. The valve 62 is of the plug type, the plug having a minute orifice 62$^a$, either the size of which or the position of the valve governing the speed with which the clutch 24 moves into engagement.

In this connection the mode of operation of the automatic pressure valve 4 may be described to advantage. This valve consists of a cylinder with a plurality of apertures 4$^a$ in annular series. Springs 61 are connected between a suitable bridge or spider 61$^a$ and the arm 61$^b$ at the end of the piston rod 14$^a$. These springs are adjustable in tension by the means 61$^c$ so that the valve can be regulated to operate at any desired pressure. Ordinarily, these springs are adjusted to operate at a pressure of approximately nine pounds above atmospheric pressure, in other words, when exhaust gas comes in at a greater pressure than desired, the piston 14 moves outwardly to uncover one or more series of apertures, permitting the excess gas to escape to atmosphere while the remaining gas flows through the pipe 40 through the cylinder 5 to actuate the piston 7.

Returning now to the time when the valve 3 is closed off as in Figure 21. The piston 7 moves back by means of the clutch spring 25$^a$ and the spring 112, as already explained, forcing the spent gas out into the exhaust gas passage 2 via the pipe 60 and valve 62. If the orifice of the valve 62 is very fine, or if the valve is of such a nature that it is capable of adjustment to present a fine orifice, then the gas will escape slowly and consequently the springs 25$^a$ and 112 will function slowly, thereby causing the clutch 24 to re-engage slowly.

The de-energization of the motor 9, by which act the valve 3 was returned to the original position, was referred to above. The motor 9 is de-energized when the crank 52 is continuing its first rotation, engages and closes the normally open contact E. Current then flows from the positive wire $d$ into the branch $h$, through magnet III, fixed contact $i$ and wire $j$ through E to the ground wire $k$.

The magnet III being thus energized even though momentarily, attracts armatures $e$ and $l$, opening contacts $e$, $f$ and closing contacts $i$, $l$. The momentary closure of contact E is sufficient for the subsequent action that must take place through the closure of the contacts $i$, $l$. When the dual-revoluble shaft 46 was rotated toward the left, the contact arm 63 pressed contact E' into engagement and completing a circuit from positive wire $d$, wire $h$, magnet III, contacts $i$, $l$, wire $m$, solenoid magnet II, wire $n$ to contacts E' and from thence to ground.

The solenoid magnet II being energized draws the core G downwardly so that contacts H$^2$ are made. This contact is held by the engagement of a spring $o$ in one of the recesses of the core. Contacts H$^2$ thus hold even after contacts E and E' are broken.

*Operation of gear shift (2).*

Upon the shunting of the current from the motor 9 by the closure of the contact E in the manner explained immediately above, the motor 9 was stopped, the spring 13 operated to return the three-way valve 3 and in due course the actuating piston 7 returned to its original position.

The pedal is now momentarily released and immediately again depressed. This action characterizes each gear shift as may be observed in the description of each operation. The push button A is not depressed. Magnet III became de-energized and the armatures $e$ and $l$ returned to their original positions when the contact at the pedal B was momentarily broken.

However since the contact B is now re-established, current flows from the positive pole of the battery C, through motor 9, contacts $e$ and $f$, wire $p$, normally closed contacts $q$, wire $r$, through the core G, contacts H$^2$, through clutch magnets R$^2$ to ground. The motor 9 being in operation, opens the valve 3 and the actuating piston 7 traverses the cylinder 5 in the same manner as in the first operation, thus turning the shaft 37 toward the left.

Crank 52 pushes the setting rod 54 rearwardly, straightening the loose connection 57 and pulling the toggle arms 44, 45 to the original full-line position in Figures 9 and 15. The continued rotation of the shaft 37 causes the arms 36$^a$ to engage the cable 64 and pull thereon in the direction of the arrow in Figure 2, thereby rotating the sleeve 65 to which the arms 45 are attached, in a clockwise direction. The toggle arms are thus set into the dotted line position in readiness for the subsequent operation of the rack piston rod 16.

Under other circumstances the cable 64 could not be pulled in the manner stated. In the instance of the second gear shifting operation, however, the energization of the magnets R$^2$ caused the lock plates 27$^a$ to lock the hub 29ª of the second lock reel 31ª, and thus prevent the cable 64 from paying out. The operation of this second lock reel is identical to that of the first and further description is thought unnecessary.

The piston rod 16 soon engages the toggle block 42, pressing on the toggle arms and bending them upwardly so that the dual-revoluble shaft 46 is now rotated toward the right and the shifting shaft 8 is rotated toward the left through the intermediate gear connections. The operation of restoring the toggle arms 44, 45 to the original full line position through the action of the crank 52 and before the cable 64 operated to convey the arms into the dotted line position, served to counter-rotate the shaft 46 so that the shifting arm 39 which in the first gear shifting operation was in engagement with the rod 40ᵇ and inclined toward the right, was moved toward the left. The gears 50, 51 were thus engaged and the shifting arm 39 sprang over to the rod 66 by virtue of the spring 67.

The shifting arm 39 cannot disengage the rod 40ᵇ when inclined either forwardly or rearwardly, because of the structure of the bell-mouth 68 of the rod. This bell-mouth is made in such a way that not until the arm reaches the vertical position, is it free to disengage by virtue of the spring 67.

Resuming now the second gear shifting operation, the movement of the shifting arm 39 toward the left brings the gear 69 in the case 1 into engagement with the second speed gear 70, since it must be remembered the arm 39 is now in engagement with the shifting rod 66. As the crank 52 continues its second rotation it eventually closes contacts E whereupon current is shunted from the motor 9 over wire $h$, magnet III, contact $i$, wire $j$, through E to ground wire $k$.

The motor 9 thus stops and the actuating piston 7 is returned to the starting position. The energization of the magnet III now effects the closure of contacts K³ and the separation of the contacts H². This is accomplished thus: The contacts E² are closed by the arm 63 when the shaft 46 is revolved to the right in the second gear shifting operation. This contact being established, current flows from the battery over wires $d$ and $h$, through magnet III, contacts $i$ and $l$, wire $m$, solenoid magnet I and over wire $s$ to ground.

By this means the core G is drawn upwardly so that contacts K³ are made in readiness for the third gear shifting operation. Contacts K³ remain in engagement by the dropping of the spring $o$ into the lower recess of the central part of the core. Reverting to the sleeve 65, it is to be observed that the sleeve has a recess 71, which is occupied by a pin 72 on the shaft 46. This arrangement permits certain necessary free movement of the sleeve without affecting the shaft.

*Operation of gear shift (3).*

The operator momentarily releases and again depresses the pedal B whereupon current flows from the battery C through the motor 9, contacts $e$ and $f$, wire $p$, contacts $q$, wire $r$, through the core G, closed contacts K³ and wire $t$ to ground. The contacts K³ are necessary to obtain a return path for the current from the motor without energizing either set of the clutch magnets R' or R².

The actuating piston 7 is again moved forwardly, the crank 52 operates to neutralize gears and also to restore the toggle arms 44, 45 to the former full line position and when the block 42 is finally engaged by the rod 16, the dual-revoluble shaft 46 is rotated toward the left and the shaft 8 is rotated to the right. The shifting arm 39 thus moves the rod 66 forwardly to engage the clutch faces 73, thus obtaining the third or full speed.

Current is shunted from the motor 9 by the closure of contacts E. These are instrumental each time in stopping the motor. Contacts E' are closed by the arm 63 in the rotation of the shaft 46 toward the left, and the current initially flowing to ground through contacts E, now traverses the path through solenoid II to ground through the closed contacts $i$, $l$ and E'. Contact H² is thus made but performs no immediate function. Contact H² is made so that when the pedal B is again depressed, the gears will be shifted back into second.

*Operation of gear shift (4).*

The crank 52 in the first part of its movement in every gear shift, restores the toggle arms 44, 45 to the original full line position and so neutralizes gears. The operator now desiring to shift from neutral into reverse, pushes the button R³ and depresses the pedal B. Current then flows from the battery through the motor 9, through contacts $e$ and $f$, magnet IV, clutch magnets R', wire $g$, through the reverse contacts beneath the button R³, over wire $u$ and through clutch magnets R² to ground.

Both clutch magnets are thus energized and consequently both cables 32 and 64 are pulled in the direction of the arrows in Figure 2, when the shaft 37 revolves toward the left by virtue of the rack rod 16. The shifter arm 39 is thus conveyed to the second rod 40ᵇ and the toggle arms 44, 45 are set into the original full line position. The pull of the cable 64, however, presently resets the arms into the dotted line position so that when the toggle block 42 is moved by the rod 16, the shaft 46 is revolved to the right and the arm 39 is moved to the left so that the gear 50 in the case 1 is brought into engagement with the idler 74 and the parts are in reverse gear.

The turning of the shaft 46 toward the right effects the closure of contacts E², and when the current is shunted from the motor 9 by the closure of contacts E, the solenoid I is energized thus making the contacts K³. In the present instance these contacts have no function.

Operation of gear shifts (5).

It has been explained under headings (1), (2) and (3), how the various increases of speed are obtained from neutral to third. Neutral is arrived at when operating in the second speed in this manner. The neutralizing device illustrated more particularly in Figures 2 and 16 is employed only on the occasion of shifting the gears into neutral from any speed, and also to neutralize gears when going directly from one speed to another.

The spark controlling rod 75 is turned by the operator so that the cable 76 pulls the primary contact arm 77 over into the path of the crank 52 and into the dotted line position in Figure 16. The normally open contacts S thus close and current flows from the battery C over wire W through contacts S and wire w to contacts v. These contacts are now closed since the arm 63 is still either in engagement with contacts E² or inclined to that side, because it must be remembered, the gears are now in second speed.

Continuing the flow of current, the motor 9 is energized. Foot pedal B does not enter in operation (5). From the motor the current flows through contacts e and f, wire p, contacts q, wire r to core G, and through the then closed contacts K³ to ground via the wire t. The motor thus operates to advance the actuating piston 7 and turn the shaft 37 so that the crank 52 returns the toggle arms 44, 45 to the original full line position through the medium of the connections 56, 57 and 58. The gear 69 is thus disengaged from the gear 70.

The motor 9 is not permitted to operate long enough, or rather to leave the valve 3 open long enough to let the piston 7 make such a stroke as will carry the rod 16 into engagement with the toggle block 42, but the current to the motor is shunted in the closing of the secondary contacts S² by the movement of the secondary contact arm 78. This arm is mounted on the stub shaft 78ª, by which the primary contact arm 77 is fixedly carried, and on which the arm 78 has a pin and slot connection 79 as clearly shown in Figure 16. The action of the arm 78 is retarded by reason of the recess and pin connection designated, between the two arms mentioned.

Also, if desired, a cable may be used between arm 78 and rod 14ª of valve 4, so that, when arm 78 is rotated the piston 14 is moved and the small apertures 4ª permit escape of gas. Pressure is thus suddenly reduced on piston 7 and rod 16 is brought to rest directly after neutralization and before engagement with toggle block 42.

When contacts S² are closed, current flows over the wire h, through magnet III, contact i, wire j, wire x, and through contacts S² to the ground. The motor 9 is thus stopped before the crank 52 reaches contacts E and before the rack rod 16 has an opportunity to act on the block 42.

Operation of gear shift (6).

When the gears are in third speed, the contacts H² are closed. The toggle arms 44, 45 are in the extreme downwardly inclined position or to the left, and the shifting arm 39 leans toward the right. Upon closure of contacts S by the operation of the rod 75, current is made to flow through the motor 9 to actuate the piston 7, thereby in turn rotating the crank 52 to bring the toggle arms to the first or starting position. This action shifts the clutch faces 73 apart.

When contacts S² are closed, in the manner already explained, the current is diverted from the motor. Contacts S² are closed, just before contacts v are opened by the arm 63, since, it must be remembered, that the contacts v are held open by the arm 63 at the neutral point. The opening of contacts v prevents flow of current to wire d from wire w, and consequently the neutral circuit is broken. No current can flow through contacts S, or S², while contacts v are open, or while the shaft 46 is in the original, full line, or neutral position, as shown in Figures 16 and 17.

The foregoing description deals altogether with the operation of the mechanism, and in connection with this the various coöperating parts have been brought in so that both the construction and operation might be easily understood. There are other details of construction to which attention is directed.

In order to prevent the escape of gas from the rear to the front of the cylinder 5 when the actuating piston 7 is moved forwardly, a novel packing device is embodied in the piston and consists of a pair of flexible washers 80 that are bent over the plates 81 at the rear. These plates in turn are curved at the periphery and perforated at 82 so that gas may get behind the curved parts of the plates, occupy the space therebetweeen and the adjacent washer and thus force the washer against the cylinder and prevent leakage.

The same structure is provided at each side of the piston. Disks 83 serve to hold and support the washers, and all are secured together on the end of the piston rod 16 substantially in the manner shown. The cylinder itself consists simply of a tube, to the ends of which the heads 84 are clamped by means of the stay bolts 85.

By reference to Figure 15 it will be observed that the pin 72 is kept in engagement with the bottom of the slot 71 by means of a spring 86 that pulls the arms 87, respectively carried by the sleeve 65 and the dual-revoluble shaft 46. The spring 86 thus keeps the toggle arms 44, 45 in the normal position.

Should an emergency arise wherein any part of either the electrical or mechanical mechanism fails to work while the vehicle is on the road, a suitable handle carried in the tool-box for the purpose, is used to shift the gears. The shifting rods 40<sup>b</sup> and 66 have lateral depressions 88 so that the end of the lever can be placed in either one in order to shift the proper rod.

The brake system.

The brake system illustrated in Figures 24, 25 and 26 is intended to be used in connection with the improved gear shifting device, and is of such a construction that an altogether leverless motor vehicle results. It will be observed in Figure 24 that certain of the parts have been slightly modified in arrangement, and the purpose of these modifications will presently become more apparent.

The shifter shaft 8 is arranged to be turned in the same manner as before, by means of the gear shifting mechanism enclosed in the casing 6. In Figure 24, the clutch pedal 23 is supplemented by the brake pedal 89. Whenever the clutch pedal 23 is depressed the counter-shaft 90 is turned and the free end of the rod 91 is made to approach the stem 92 of the brake rod 93.

A joint 94 on the end of the ratchet rod 95 constitutes the pivot on which the rod 91 turns in the present instance. The rod 95 does not move when the clutch pedal 23 only is depressed, and thus it is that the joint 94 becomes the pivot on which the rod 91 turns. Should the brake pedal 89 only be depressed, the rod 91 is not moved but the brake rod 93 advances until the stem 92 just about engages the rod 91. The service brake rocker shaft 96 is operated upon the depression of the brake pedal 89. Should both pedals be depressed at the same time, all of the aforesaid parts move together and the dog 97 is made to engage the teeth of the ratchet bar 98 and thus hold the emergency brake rocker shaft 99 in its advanced position. The emergency brake is thus applied.

A shaft 100 is connected to an arm 101 which also has a spring 102. The other end of the shaft carries a piston 103 in the brake engager cylinder 104. The cylinder is filled with oil and its ends are connected by a pipe 105 which has a plug valve 106 with a small opening, the ease with which the emergency brake is released, being controlled by the position and size of the small opening in said valve.

When the emergency brake is suddenly applied as by depressing both pedals, the oil in the cylinder can readily flow past the piston 103 when it moves in the direction of the arrow, by reason of the construction of the piston as in Figure 26. Under other circumstances the emergency brake is slowly released by the action of the stored tension in the spring 102 on the piston in the other direction, when the ratchet bar is released from the dog 97.

Instead of attaching the clutch cable 21 directly to the pedal 23, it is now attached to the arm 107 on the counter-shaft 90 and to which the connecting link of the clutch pedal is joined. A branch 21<sup>a</sup> of the clutch cable extends to the ratchet bar 98, so that when the clutch cable is operated the clutch 24 is disengaged and the ratchet rod 98 is released. A stem 92<sup>a</sup> corresponding to the stem 92 on the brake rod 93, forms the second support for a supporting rod 108. The rod 108 is pressed beneath the rod 91 by means of springs on the pendent stems. The rod 91 is thus kept from unnecessary vibration.

While the construction and arrangement of the gear shifter and its various cooperating mechanism, as herein described and claimed, is that of a generally preferred form, obviously modifications and changes may be made without departing from the spirit of the invention or the scope of the claims.

I claim :—

1. The combination, of an exhaust gas manifold, transmission gears, and means actuated by the pressure of the exhaust gas in said manifold for shifting said gears.

2. The combination with the exhaust gas conduit of an internal combustion engine, and transmission gears; of means actuated by gas pressure in said conduit for shifting said gears.

3. The combination with the exhaust gas conduit of an internal combustion engine, and transmission gears; of means actuated by gas pressure in said conduit for shifting said gears, and means for controlling the gas pressure effective for operating said means.

4. The combination with the exhaust gas conduit of an internal combustion engine, and transmission gears; of means actuated by gas pressure in said conduit for shifting said gears, means for controlling the gas pressure effective for operating said means, and means for regulating said controlling means.

5. The combination with an exhaust gas conduit and the transmission gears of an internal combustion engine; of means for utilizing the gas pressure to shift said gears, and adjustable means for regulating the effective gas pressure regardless of the volume of gas discharged in said conduit.

6. The combination with an exhaust gas conduit and transmission gears; of means for utilizing the gas pressure to shift said gears, means for diverting the gas into said shifting means, and automatically operative means for regulating the effective gas pressure regardless of the volume of gas admitted.

7. The combination with an exhaust gas conduit and transmission gears; of means for utilizing the gas pressure for shifting the gears, electrically operated means for diverting the gas from the conduit to said means, tension operated automatic means for regulating the pressure effective to actuate said shifting means regardless of the volume of gas diverted from said conduit, and means for adjusting the tension of said controlling means.

8. In combination with an exhaust gas manifold and transmission gears; means for diverting the gas, pressure-movable means actuated by said gas for shifting said gears, means for regulating the pressure admitted to said shifting means, including an encased tension-held movable member with companion normally closed vents; and means for adjusting the tension of said member to determine the pressure imposed before said member uncovers said vents.

9. In combination with an exhaust gas manifold and transmission gears; a reciprocating member in operable connection with said gears, and means in operable connection with said manifold for actuating said member by gas pressure in said manifold.

10. In combination with an exhaust gas manifold and transmission gears; a reciprocating member in operable connection with said gears, means in operable connection with said manifold, for actuating said member by gas pressure in said manifold, and means for automatically regulating the pressure effective to reciprocate said member regardless of the pressure in said manifold.

11. In combination with an exhaust gas manifold and transmission gears; a reciprocatable member movable in one direction by gas pressure to shift said gears, and pressure regulating means movable in the opposite direction to govern the quantity of gas effective to move said member regardless of the volume discharged in said manifold.

12. In combination with an exhaust tappet and disengaged spring pressed clutch; means for entrapping and utilizing a portion of the gas to disengage the clutch when moved in one direction and means for controlling the discharge of the spent gas on the reverse movement of said means by the exertion of the clutch spring, to govern the speed of reengagement of said clutch.

13. In combination with an exhaust gas conduit, and disengaged spring pressed clutch, electrically operated means for diverting the gas, pressure-responsive means automatically controlling the effective pressure regardless of the volume of gas discharged, reciprocable means moved in one direction by said effective pressure to disengage the clutch, and control means associated with the pressure regulating means and said conduit, for governing the speed of escape of spent gas into the conduit on the reverse movement of said disengaging means by the action of the spring of the reengaging clutch, when said gas diverting means is restored to the normal position.

14. A gear shifter comprising a cylinder with a piston, means for conducting gas from an exhaust conduit to move the piston, electrically operated means for opening and closing said conductor and means in said conductor for automatically keeping the effective pressure in the cylinder to a predetermined amount regardless of the volume of gas discharged into the conductor.

15. A gear shifter, comprising a cylinder with a piston, means for conducting exhaust gas from a manifold to move the piston, opening and closing means in said conducting means, and tension-held pressure controlling means in a gas receiving casing with normally non-registering perforations, becoming uncovered as the gas pressure increases to keep the pressure effective to move the piston at a predetermined degree.

16. A gear shifter, comprising a pressure movable piston with a rack rod, gear neutralizing means revolubly actuated thereby, and reciprocable gear shifting means in normal disengagement with said rod but engaged thereby upon movement by the piston.

17. A gear shifter, comprising a gas pressure movable piston with a rack rod, transmission gear neutralizing means revolubly actuated by said rod on the initial movement, and gear shifting means subsequently engaged by said rod but left in the position arrived at by said engagement after said rod recedes, to maintain the gears in the shifted position.

18. A gear shifter, comprising a cable connected at one end to a gear shifting member, revoluble means to which the other end is attached, electrically operated means for locking said means from revolution, and a pressure operated piston with actuated rotatable means for producing tension in said cable.

19. A gear shifter, comprising a cable attached at one end to a gear shifting member, a revoluble member to which the other end is attached, electrically operated means for locking said member from revolution, a pressure operated piston with a rack rod, and means revolved by the motion of said rod to produce tension in the cable, including an arm arranged to move against the cable.

20. The combination with the shifter rod and shiftable gear of a transmission mechanism, a partially revoluble member in engagement with the rod, means for actuating said revoluble member in one or the other direction, said means including toggle arms with sleeve and shaft connections; reciprocable means for acting on said actuating means, and instrumentalities arranged to employ the pressure of exhaust gas from a motor to operate said reciprocable means.

21. The combination with the shifter rod and shiftable gear of a transmission mechanism, a partially revoluble member in engagement with the rod, means for actuating said revoluble member in one or the other direction, said means including toggle arms with sleeve and shaft connections; reciprocable means for acting on said actuating means, instrumentalities arranged to employ the pressure of exhaust gas from a motor to operate said reciprocable means, and means operating in the first part of the movement of the reciprocable member to set said actuating means in the normal and starting position.

22. The combination with the shifter rod and shiftable gear of a transmission mechanism, a partially revoluble member in engagement with the rod, means for actuating said revoluble member in one or the other direction, said means including toggle arms with sleeve and shaft connections; reciprocable means for acting on said actuating means, instrumentalities arranged to employ the pressure of exhaust gas from a motor to operate said reciprocable means, means operating in the first part of the movement of the reciprocable member to set said actuating means in the normal and starting position, and means arranged to set said actuating means in another position to obtain the alternative movement of said actuating means upon engagement therewith of the reciprocable member, said means including a normally loose reel but capable of being locked with a flexible actuating connection to the sleeve of the aforesaid toggle arms.

23. The combination with the shifter rod and shiftable gear of a transmission mechanism, means for moving the rod including a shifting arm in engagement therewith, a dual-revoluble shaft with operating connections to said arm to move it either forwardly or backwardly, instrumentalities for producing the required movement to revolve said shaft, including a reciprocable piston actuated by the pressure of exhaust gas; means associated with and partly carried by said shaft to cooperate with a part of said piston to revolve the shaft as stated, including a pin connected sleeve on the shaft with toggle arms and an engageable block; and means operated on the initial movement of the piston before said block is engaged, to set the toggle arms in a normal and starting position to obtain the operation of the dual-revoluble shaft in one direction.

24. The combination with the shifter rod and shiftable gear of a transmission mechanism, means for moving the rod including a shifting arm in engagement therewith, a dual-revoluble shaft with operating connections to said arm to move it either forwardly or backwardly, instrumentalities for producing the required movement to revolve said shaft, including a reciprocable piston actuated by the pressure of exhaust gas; means associated with and partly carried by said shaft to cooperate with a part of said piston to revolve the shaft as stated, including a pin connected sleeve on the shaft with toggle arms and an engageable block; means operated on the initial movement of the piston before said block is engaged, to set the toggle arms in a normal and starting position to obtain the operation of the dual-revoluble shaft in one direction, and means for setting the toggle arms in another position to obtain the reverse rotation of said shaft, said means including a normally loose but lockable reel with a connection to said sleeve whereby the sleeve is turned and the toggle arms are reset.

25. The combination with a shiftable clutch, of a revoluble member including a clutch pedal gear in operative connection with a part of the clutch, a reciprocable member including an actuating piston having a rod arranged to turn the gear and disengage the clutch, means for conducting exhaust gas to the actuating piston to act thereon, said means including a valve and electrically operated means for actuating the valve at will.

26. A gear shifter comprising a normally open electric circuit, clutch magnets embraced in the circuit and energized upon closure thereof, a cable reel locked upon energization of the magnets, a shiftable gear with a shifting rod, a shifting arm in normal disengagement with the shifting rod, a connection between the reel and the shifting arm, a revoluble shaft having means for producing tension in said cable to move the shifting arm into engagement with the shifting rod, means for revolving said shaft including an actuating piston having a rod cooperating with said shaft, an exhaust gas conduit provided with a valve and having an outlet against said piston, and means embraced in the electrical circuit for operating the valve to open the conduit at the same time that the clutch magnets are energized.

27. A gear shifter, comprising an electrical circuit with a pedal-operated closer and push button, a transmission mechanism including a pair of shifting rods having gears shiftable thereby, a shifting arm normally stationed at one rod but capable of being moved from one rod to the other, a motor in said circuit having a valve and being energized on the initial depression of the pedal and push button, an actuating piston and exhaust gas conduit discharging against the piston, controlled by said motor valve; a flexible element connected at one end to the shifting arm, a normally free lock reel to which the other end of said element is connected, a clutch magnet in the circuit energized upon the depression of the button and pedal and arranged to prevent the lock reel from moving when thus energized, and a rotatable shaft having an arm, operated through the instrumentality of the piston to move the arm against the flexible element to create tension therein and pull the shifting arm over to the other shifting rod.

28. In a gear shifter, a dual-revoluble shaft having toggle arms carried thereby, a revoluble shaft with a crank end, and instrumentalities cooperating between both shafts to set the toggle arms at a normal and starting position in the initial part of the movement of the crank end.

29. In a gear shifter, a dual-revoluble shaft having toggle arms carried thereby, a revoluble shaft with a crank end, a setting rod with a trip arm having a shoulder in the path of the crank end, a pendent member on the setting rod having a flexible and resilient connection to a part of the dual-revoluble shaft, to set the toggle arms in the initial or starting position in the first part of the movement of the crank end against said shoulder, and resilient means cooperating with the setting rod to return it after the crank end leaves the shoulder of the trip arm.

30. In a gear shifter, a dual-revoluble shaft having toggle arms carried thereby, a revoluble shaft with a crank end, a setting rod with a trip arm having a shoulder in the path of the crank end, a pendent member on the setting rod having a flexible and resilient connection to a part of the dual-revoluble shaft, to set the toggle arms in the initial or starting position in the first part of the movement of the crank end against said shoulder, resilient means cooperating with the setting rod to return it after the crank end leaves the shoulder of the trip arm, and means embodied in the construction and mounting of the trip arm to permit the crank end to pass on the reverse rotation of the revoluble shaft.

31. In a gear shifter, a gear shifting rod with a shiftable gear, a shifting shaft having a shifting arm in engagement with said rod and capable of moving the rod into either of two positions, a dual-revoluble shaft in gear connection with the shifting shaft, a revoluble shaft having a crank end, and a setting rod with a connection to the dual-revoluble shaft, and in position to be acted on in the initial movement of the crank end to automatically restore the shifting arm and shifting rod to normal and neutral position.

32. In a gear shifter, a gear shifting rod with a shiftable gear, a shifting shaft having a shifting arm in engagement with said rod and capable of moving the rod into either of two positions, a dual-revoluble shaft in gear connection with the shifting shaft, a revoluble shaft having a crank end, and a setting rod with a connection to the dual-revoluble shaft, and in position to be acted on in the initial movement of the crank end to automatically restore the shifting arm and shifting rod to a normal and neutral position, and means subsequently acting upon the dual-revoluble shaft to revolve said shaft in a predetermined direction and accordingly move the shifting arm and shifting rod to one or the other of the two positions.

33. In a gear shifter, an exhaust gas conduit having a valve controlled by-pass, a cylinder having an actuating piston moved forwardly when gas is admitted to the cylinder through the by-pass upon opening the valve, a rack piston rod carried by the piston, a shifting rod with a shiftable gear arranged to be moved into either of two positions, a shifting shaft having an arm in engagement with the rod, a dual-revoluble shaft in gear connection with the shifting shaft, a sleeve on tne shaft with toggle arms, and a toggle block in the path of the rack piston rod and having toggle arms joined to the other toggle arms, to rotate the dual-revoluble shaft in either of two directions upon the engagement of the piston rod with the toggle block and accordingly move the shifting rod, as said toggle arms are set in either of two initial positions.

34. In a gear shifter, an exhaust gas conduit having a valve controlled by-pass, a cylinder having an actuating piston moved forwardly when gas is admitted to the cylinder through the by-pass upon opening the valve, a rack piston rod carried by the piston, a shifting rod with a shiftable gear arranged to be moved into either of two positions, a shifting shaft having an arm in engagement with the rod, a dual-revoluble shaft in gear connection with the shifting shaft, a sleeve on the shaft with toggle arms, and a toggle block in the path of the rack piston rod and having toggle arms joined to the other toggle arms, to rotate the dual-revoluble shaft in either of two directions upon the engagement of the piston rod with the toggle block and accordingly move the shifting rod, as said toggle arms are set in either of two initial positions, and means actuated by the rack piston rod in its initial advancement to set the toggle arms either in the normal or second position.

35. In a gear shifter, a shifting rod having a shiftable gear, a shifting shaft having an arm in engagement with the rod, a dual-revoluble shaft, a sleeve on the shaft and having a pin and slot connection therewith, toggle arms carried by the sleeve, means including a crank-operated setting rod with a connection to said shaft to initially set the toggle arms in a downwardly inclined position, and means including a flexible connection to said sleeve, arranged to be subsequently brought into action to reset the toggle arms into the upwardly inclined position, thereby obtaining a forward or backward movement of the shifting rod accordingly as the toggle arms are positioned and when the toggle arms are subsequently acted on to turn the dual-revoluble shaft.

36. In a gear shifter, a dual-revoluble shaft having a pin, a sleeve with a slot, on the shaft and receiving the pin, and means mutually carried by the shaft and sleeve and including a resilient member to normally hold the pin in engagement with one side of the slot.

37. In a gear shifter, a dual-revoluble shaft, a sleeve with toggle arms, on the shaft, and means embodied in the shaft and sleeve permitting the positioning of the toggle arms above or below the horizontal plane of the shaft without revolving said shaft, said means including a pin and slot connection.

38. A gear shifter, comprising a clutch, a transmission mechanism including a shifting rod with a first speed gear, a shifting arm arranged to be moved over into engagement with said rod, a shifting shaft carrying the arm and arranged upon rotation to move the rod and gear into the first speed position, a revoluble shaft having a clutch pedal gear and an arm, a flexible connection between said gear and a part of the clutch, a flexible connection passing over the arm and having an end attached to the shifting arm, and an exhaust gas-actuated piston with a rack piston rod arranged to rotate the revoluble shaft, create tension in both flexible connections, simultaneously bringing the shifting arm into contact with said shifting rod and throwing the clutch out.

39. A gear shifter, comprising a clutch, a transmission mechanism including a shifting rod with a first speed gear, a shifting arm arranged to be moved over into engagement with said rod, a shifting shaft carrying the arm and arranged upon rotation to move the rod and gear into the first speed position, a revoluble shaft having a clutch pedal gear and an arm, a flexible connection between said gear and a part of the clutch, a flexible connection passing over the arm and having one end attached to the shifting arm, an exhaust gas-actuated piston with a rack piston rod arranged to rotate the revoluble shaft, create tension in both flexible connections, simultaneously bringing the shifting arm into contact with said shifting rod and throwing the clutch out, and means subsequently actuated upon the continued advancement of the rack piston rod to turn the shifting shaft and move the first speed gear into the first position.

40. A gear shifter, comprising an actuating piston having a piston rod with a rack, a counter-shaft having a gear in mesh with the rack and a pinion, a revoluble shaft having a clutch pedal gear in mesh with the pinion, an arm on the shaft including a hub and a roller, a rotatable shifting shaft with a non-circular portion, a shifting arm movable on the non-circular portion, a transmission mechanism including a shifting rod with a first speed gear, a flexible connection extending across the roller and hub and connected at one end to the shifting arm, and means providing the attachment for the other end, capable of paying out said connection under certain circumstances so as not to move the shifting arm, said means including a lock reel arranged to be rendered fixed to hold the end of the flexible connection whereby tension is created in said connection on the operation of the piston and the revoluble shaft, to move the shifting arm over to the shifting rod.

41. In a gear shifter, a rotatable shifting rod having spaced abutments with an intermediate non-circular portion, a shifting frame and shifting arm slidable on said non-circular portion, a cable attached to one side to pull the frame toward one of the abutments, and a resilient element connected to the other side to return the frame to the other abutment.

42. The combination in a gear shifter, of a rotatable shifting shaft having spaced abutments with an intermediate non-circular portion, a shifting frame and shifting arm slidable on said non-circular portion, a pair of shifting rods extending across the non-circular portion with suitably constructed housings to respectively receive the shifting arm, a cable attached to one side of the frame to pull it against one abutment and the shifting arm into engagement with one housing, and a resilient element connected to the other side to return the arm to the other housing when tension on the cable is released.

43. The combination in a gear shifter, of a valve motor, a cylinder containing a piston and having an exhaust gas conduit controlled by the valve of the motor, a rack piston rod carried by the piston, a revoluble shaft with a crank end, rotated when the piston and rod are advanced, an electrical circuit comprising a main branch embracing the motor and arranged to be closed to start the motor, turn the valve and admit exhaust gas into the aforesaid conduit and advance the piston and rod and turn the revoluble shaft; and a shunt circuit embracing normally open contacts arranged to be closed when the crank end reaches one of the contacts, to complete the shunt circuit and de-energize the motor.

44. The combination in a gear shifter, of a valve motor, a cylinder containing a piston and having an exhaust gas conduit controlled by the valve of the motor, a rack piston rod carried by the piston, a revoluble shaft with a crank end, rotated when the piston and rod are advanced, an electrical circuit comprising a main branch embracing the motor and arranged to be closed to start the motor, turn the valve and admit exhaust gas into the aforesaid conduit and advance the piston and rod and turn the revoluble shaft; a shunt circuit embracing normally open contacts arranged to be closed when the crank end reaches one of the contacts, to complete the shunt circuit and de-energize the motor, and means for returning the valve to the normal position when the motor is de-energized, said means including a spring operating in connection with the valve.

45. Means for reversing the gears of the transmission mechanism in a gear shifter, comprising a shifting rod and a movable shifting arm arranged to be advanced into engagement with the rod, a shifting shaft having a non-circular portion carrying the shifting arm and arranged to be turned in one direction to move the rod into the reverse gear position, an electrical circuit having push button and pedal closures, a motor embraced in the main branch of the circuit and having a valve for controlling exhaust gas, a cylinder having a piston with a rack rod, arranged to be advanced on the opening of the valve, a revoluble shaft with a pair of arms, a pair of normally free lock reels cooperating with the arms, a dual-revoluble shaft having a sleeve with toggle arms arranged to be set in a specified position, a flexible element connected to one lock reel and extending across one arm to the shifting arm, a second flexible connection secured to the other lock reel and extending across the other arm to said sleeve, means operated by the rack rod to turn the revoluble shaft upon advancement of the piston, clutch magnets cooperating with each lock reel and energized upon closure of the circuit to lock the reels and prevent paying out of the flexible elements, thereby simultaneously turning the sleeve and toggle arms to said specified position and moving the shifting arm into engagement with said shifting rod, and means including a toggle block for subsequently rotating the sleeve and dual-revoluble shaft to turn the shifting shaft and move the shifting rod to the reverse gear position, when the end of the rack rod engages said toggle block.

46. The combination in a gear shifter, of a revoluble shaft with a crank end, a neutralizing device comprising a shaft with a primary contact arm normally keeping a pair of contacts open, a manually operated connection to said arm for moving it into the path of the crank end, and a secondary contact arm on the same shaft with a pin and slot connection to the first arm, to make a second set of contacts upon action of the crank end on said primary contact arm.

47. In a gear shifter, an electrical circuit including a pedal-operated closer adapted to be successively depressed to obtain various gear shifts, and a double reciprocable solenoid core having a contact at each end, arranged to remain in position to close a part of another circuit after each actuation of the pedal.

48. In a gear shifter, an electrically operated lock reel, comprising a fixed lock reel shaft with a non-circular portion, a hub on the said portion, a lock reel revoluble on said shaft with a coil spring connection therebetween and the hub, a lock hub on the reel, and magnets having armatures arranged to be mutually attracted and to bind against the lock hub to lock the reel when the magnets are energized.

WILLIAM GRANT STEVENS, Jr.